United States Patent [19]

Varrese

[11] Patent Number: 4,768,382
[45] Date of Patent: Sep. 6, 1988

[54] METHOD OF PRODUCING A UNIFORM FLUID-TIGHT SEAL BETWEEN A THIN, FLEXIBLE MEMBER AND A SUPPORT AND AN APPARATUS UTILIZING THE SAME

[75] Inventor: Francis R. Varrese, Ambler, Pa.

[73] Assignee: Honeywell Inc., Minneapolis, Minn.

[21] Appl. No.: 41,953

[22] Filed: Apr. 23, 1987

[51] Int. Cl.⁴ .............................................. G01L 7/08
[52] U.S. Cl. ...................................... 73/715; 29/454; 92/103 M; 228/165; 228/184
[58] Field of Search .................. 73/706, 715, 716–729; 228/165, 184; 29/454; 92/103 M

[56] References Cited

U.S. PATENT DOCUMENTS 3,456,509  7/1969  Thordarson ......................... 73/715
4,541,282  9/1985  Auerweck et al. ................... 73/715

*Primary Examiner*—Donald O. Woodiel
*Attorney, Agent, or Firm*—Mitchell J. Halista; Albin Medved

[57] ABSTRACT

A method of producing a fluid-tight seal between a thin, flexible member and a member support including the steps of providing a pair of spaced apart braze material receiving recesses on an external surface of the member support having a combined depth to accommodate excess braze material during the brazing of the member to the support, positioning the member to extend across the recesses and the surface and brazing the member to the surface while maintaining the contact between the braze material and the member. An apparatus using this method to produce a fluid-tight seal for a thin, flexible member comprises a support surface, a pair of excess braze material receiving spaced apart recesses on the surface and having a combined depth for accommodating excess brazing material and a brazing material located between the member and the surface and covering the recesses and an adjacent portion of the support surface.

14 Claims, 2 Drawing Sheets

METHOD OF PRODUCING A UNIFORM FLUID-TIGHT SEAL BETWEEN A THIN, FLEXIBLE MEMBER AND A SUPPORT AND AN APPARATUS UTILIZING THE SAME

CROSS-REFERENCE TO CO-PENDING APPLICATION

A bonding method and a resulting structure shown but not claimed herein is shown and claimed in a co-pending application Ser. No. 041,952 of Francis R. Varrese, filed on even date herewith.

BACKGROUND OF THE INVENTION

1. Field of the Invention

The present invention relates to bonding techniques. More specifically, the present invention is directed to a method for bonding a thin, flexible member to a support and an apparatus utilizing such a bonding method.

2. Description of the Prior Art

In order to uniformly bond a thin, flexible member, e.g., a diaghragm for a pressure transducer, to a rigid support without inducing distortion of the edge of the diaghragm during a brazing of the diaphragm to the support, there has been provided in the prior art a method utilizing a moat and dam arrangement as shown in U.S. Pat. No. 4,541,282 for diverting excess braze material. While this prior art method is effective to minimize a distortion of the diaghragm's peripheral edge, it did not control the exuding of excess braze material at the diaphragm's outer periphery. Thus, the additional machining required to remove the exuded braze material at the outer periphery as well as the machining of the moat or otherwise providing the moat in the support has not been cost-effective. Accordingly, it is desirable to provide a novel method and an apparatus utilizing the method for uniformly bonding a thin, flexible member to a support without either the lack of complete control of the braze material or the cost disadvantage of the prior art.

SUMMARY OF THE INVENTION

An object of the present invention is to provide an improved method for uniformly bonding a thin, flexible member to a support and an apparatus utilizing such a method.

In accomplishing this and other objects, there has been provided, in accordance with the present invention, a method for producing a fluid-tight seal between a thin, flexible member and a support including the steps of providing a pair of spaced apart recesses on a surface of a support for receiving excess braze material, positioning the member to extend across the recesses and the external surface of the support surrounding the recesses and brazing the member to the surface while maintaining the contact between the braze material, the member and the support to produce a fluid-tight seal. Apparatus using this method to produce a fluid-tight seal for a thin, flexible member comprises a support surface, a pair of spaced apart excess braze material receiving recesses on said surface and a brazing material means between said member and said surface in said recesses and on said surface adjacent to said recesses.

BRIEF DESCRIPTION OF THE DRAWINGS

A better understanding of the present invention may be had when the following detailed description is read in connection with the drawings in which.

DESCRIPTION OF THE PREFERRED EMBODIMENT

Detailed Description

Figure 1:
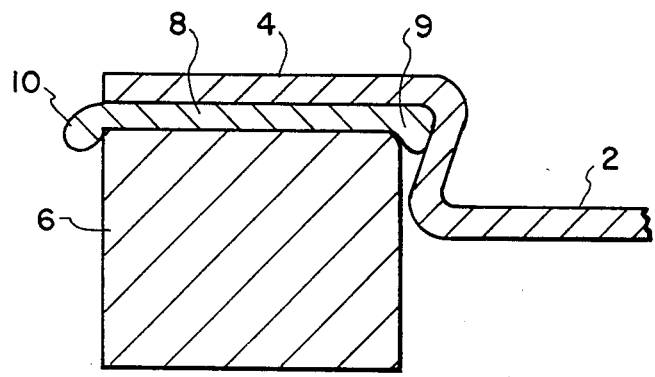
FIG. 1 is cross-sectional illustration of a structure utilizing a prior art technique for bonding a thin, flexible member to a support.

Referring to FIG. 1 in more detail, there is shown a cross-sectional illustration of a structural connection utilizing a prior art technique for bonding a thin, flexible member to a substrate. The thin, flexible member may be in the form of a diaghragm 2 which is attached at its peripheral edge 4 to an annular support substrate 6. A braze material in the form of a braze layer 8 is arranged between the outer peripheral edge 4 of the diaphragm 2 and the support 6 to provide a fluid-tight bond between the diaphragm 2 and the support 6. Such a bonding technique frequently exhibits a diaphragm distortion problem occasioned by the flow of the braze material 8 radially inwardly of the support 6 to produce an inner peripheral lip 9 of the braze material 8. This lip 9 is effective to distort the adjacent portion of the diaphragm 2 to produce a subsequent non-uniform operation of the diaphragm 2 in its working environment, e.g., a pressure transducer. Additionally, the braze material 8 flows radially outwardly of the support 6 to produce an outer peripheral lip 10 of the braze material 8. This outer lip 10 must be removed by subsequent machining which adds to the cost of the product utilizing the diaphragm 2.

Figure 2:
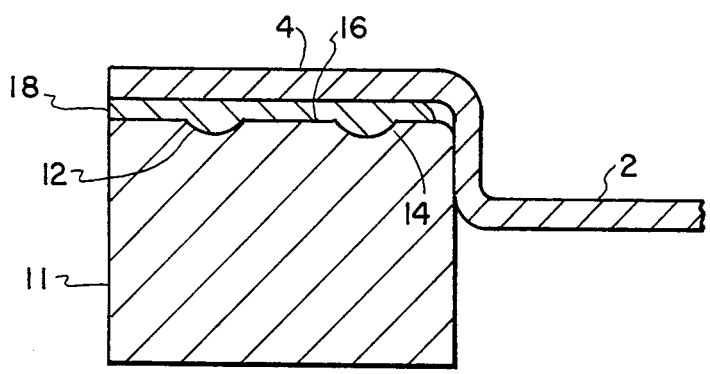
FIG. 2 is a cross-sectional illustration of a bonded flexible member structure utilizing an example of the present invention.

In FIG. 2, there is shown a cross-sectional illustration of a diaphragm to a support substrate bond utilizing the method of the present invention. In this method, the diaphragm 2 is attached to an annular support substrate 11 having a pair of continuous coaxial annular recesses 12,14 located in a surface 16 of the substrate 11 facing the diaphragm 2, i.e., a radially inward recess 14 and a radially outward recess 12. The surface 16 of the substrate 11 adjacent to the recesses 12,14 is a substantially flat surface, and the recesses 12,14 are transversely spaced thereon. A braze material layer 18 is provided between the outer peripheral edge 4 of the diaphragm 2 and the surface 16 to bond the outer peripheral edge 4 to the substrate 11.

It should be noted that the surface 16 may be coated, e.g., vacuum deposition, with a material to enhance the wettability of the surface 16 for the braze material 18 to enhance the bond thereto, e.g., nickel or copper. The recesses 12,14 have a common depth and function to receive any excess braze material from the braze layer 18 therein. Thus, the excess braze material is diverted into the recesses 12,14 rather than either to the inner edge of the substrate to minimize any distortion of the diaphragm 2 or to the outer periphery of the diaphragm 2 to avoid any subsequent machining. Accordingly, the outer peripheral edge of the diaphragm 2 is uniformly supported on the substrate support 11, and the excess braze material is confined to the recesses 12,14.

Figure 3:
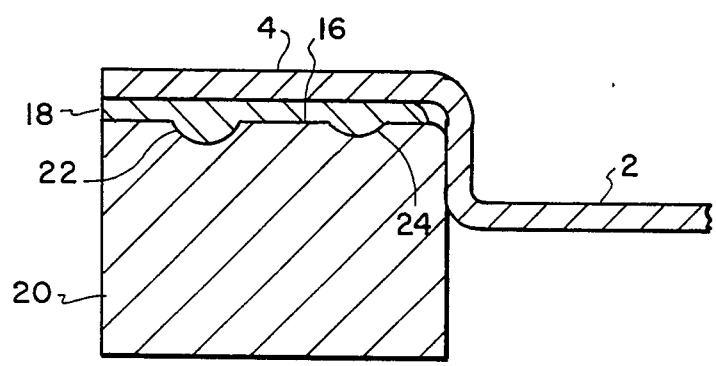
FIG. 3 is a cross-sectional illustration of a bonded structure utilizing an alternate embodiment of the method and structure shown in FIG. 2.

In FIG. 3, there is shown an alternate embodiment of the structure shown in FIG. 2 with common reference numbers being used to indicate elements also found in the embodiment shown in FIG. 2. In this embodiment, a pair of continuous, coaxial annular recesses 22,24 in the surface 16 of a support substrate 20 are dissimilar in depth. Thus, a first radially outward recess 22 has a greater depth than a radially inward recess 24. Accordingly, the greater braze receving depth of the radially outward recess 22 is effective to further confine the braze material layer 18 to the space between the diaphragm 2 and the surface 16 and to the recesses 22,24.

Figure 4:
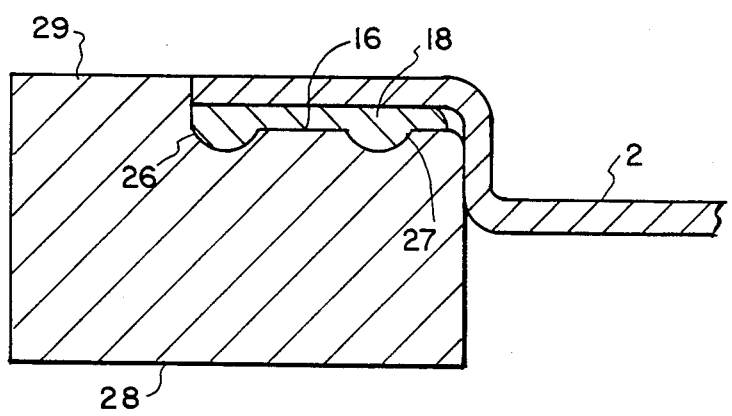
FIG. 4 is a further alternate embodiment of the present invention.

In FIG. 4, there is shown a still further alternate embodiment of the present invention. In this embodiment, a pair of continuous, coaxial annular recesses 26,27 are provided in a surface 16 of a support substrate 28 to receive excess braze material from a braze layer 18 in a manner similar to that described above with respect to either FIGS. 2 and 3. The support 28 also includes an upwardly projecting annular ridge 29 which is located on the outer periphery of the support 28 and functions as a stop for the outer peripheral edge of the diaphragm 2 to prevent a transverse displacement nf the diaphragm 2 on the support 28. The outer recess 26 is effective to prevent a flow of the braze material layer 18 outwardly past the stop ridge 29 which avoids any subsequent machining of the ridge 29.

Figure 5:
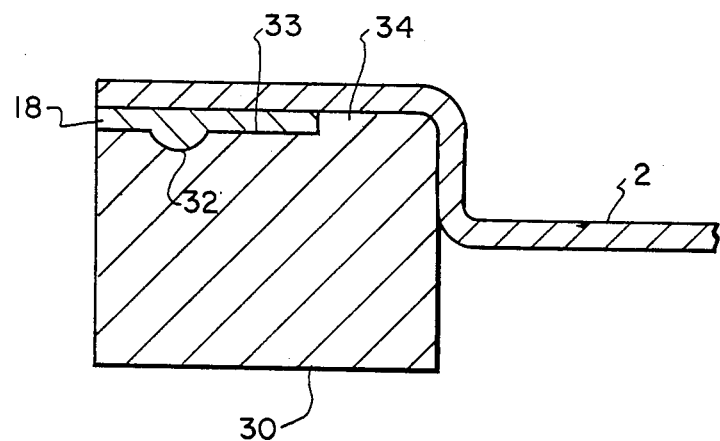
FIG. 5 is a cross-sectional illustration of a bonded structure utilizing an alternate bonding method and FIG. 6 is a cross-sectional illustration of a transducer apparatus using the bonding method shown in FIG. 2.

In FIG. 5 there is shown a cross-sectional illustration of a bonded structure utilizing an alternate bonding method. In this method, the diaphragm 2 is attached to an annular support substrate 30 having a single continuous annular recess 32 located in a surface 33 of the support 30 facing the diaphragm 2. An upwardly projecting annular ridge 34 is located on the inner periphery of the support 30 and is radially spaced from the recess 32. The ridge 34 contacts the diaphragm 2 to stop a flow of the braze material while the recess 32 retains any excess braze material especially any braze material that might exude past the outer periphery of the diaphragm 2. Thus, the braze layer 18 extends outwardly from the ridge 34 to uniformly bond the diaphragm 2 to the support 30.

Figure 6:
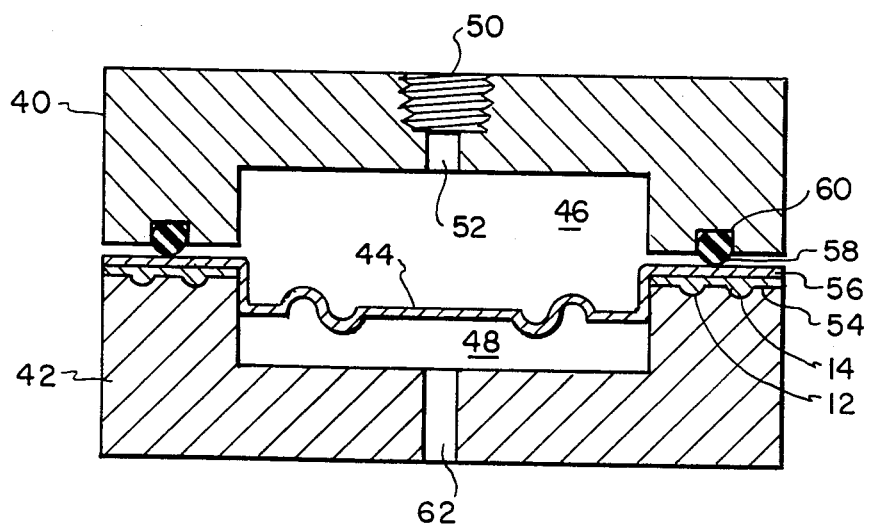

In FIG. 6, there is shown an example of a transducer apparatus utilizing the bonding technique discussed above with respect to FIG. 2. In this transducer apparatus, an open end of a cylindrical cover cap 40 is axially aligned with a cylindrical transducer housing 42 to form a transducer apparatus. The cover 40 and the housing 42 may be of any suitable material, e.g., stainless steel. A flexible diaphragm 44 is arranged to separate a space 46 within the cover 40 from a space 48 within a housing 42. A fluid inlet connection 50 is provided in the cover 40 to allow the connection of a fluid inlet line (not shown). A fluid inlet port 52 is arranged to admit fluid from the inlet line to the space 46 within the cover cap 40. A diaphragm support substrate is provided by a radially outward surface 54 on the end of the housing 42 which surface is attached to the one side of an outer periphery of the diaphragm 44 by a braze alloy layer 56 using the aforesaid bonding technique. The other side of the periphery of the diaphragm 44 is provided with a fluid-tight seal to the cap 40 by an O-ring 58 arranged in a recess 60 within a peripheral edge of the cover 40. The cover 40 is attached to the housing 42 by any suitable means, e.g., bolts (not shown). A port 62 is provided within the housing 42 to connect the space 48 to a fluid pressure sensing transducer which may be a conventional strain sensing element (not shown).

A substantially incompressible fluid (not shown) is used to fill the space 48 and the port 62 to transmit a fluid pressure from the diaphragm 44 to the strain sensitive element which would, in turn, provide an electrical outlet signal representative of the fluid pressure applied to the transducer apparatus from the fluid inlet port 52. While the specific example of a fluid transducer apparatus shown in FIG. 6 uses the bonding technique and structure shown in FIG. 2, it should be noted that the embodiments shown in FIGS. 3, 4 and 5 may also be used to provide a fluid-tight seal between a thin, flexible membrane and a support substrate.

Accordingly, it may be seen that there has been provided, in accordance with the present invention, an improved method for producing a fluid-tight seal between a thin, flexible member and a support and an apparatus utilizing the same.

The embodiments of the present invention in which an exclusive property or privilege is claimed are defined as follows:

1. A method of producing a fluid-tight seal between a thin, flexible member and a member support including the steps of providing a pair of radially spaced recesses on an external surface of the member support, positioning the member to extend across the recesses and the external surface of the support surrounding the recesses and brazing the member to the external surface while maintaining the contact between the member and the surface of the member support to uniformly support the member.

2. A method as set forth in claim 1 wherein the pair of recesses have a common depth.

3. A method as set forth in claim 1 wherein the pair of recesses have different depths.

4. A method as set forth in claim 1 and including the further steps of providing an upwardly extending ridge of the surface spaced from the pair of recesses and positioning an edge of the member against the ridge prior to brazing of the member.

5. A fluid-tight seal for a thin flexible member comprising
 a support surface,
 a pair of spaced apart braze material receiving recesses on said surface and
 brazing material means between said member and said surface and extending across said recesses and an adjacent surface of said surface, said recesses having a combined depth for receiving excess braze material to prevent exuding of said braze material past said surface.

6. A fluid-tight seal as set forth in claim 5 wherein said pair of recesses have a common depth.

7. A fluid-tight seal as set forth in claim 5 wherein said pair of recesses have different depths.

8. A fluid-tight seal as set forth in claim 5 and including an upwardly extending ridge on said surface providing a stop for an edge of said member and being spaced from said recesses.

9. A pressure transducer comprising
 a thin, flexible diaphragm, an annular support surface for said diaphragm,
a pair of spaced apart annular recesses on said support surface for receiving excess braze material and
brazing material means between said diaphragm and said surface extending across said recesses and said surface adjacent to said recesses.

10. A transducer as set forth in claim 9 wherein said recesses are coaxial.

11. A transducer as set forth in claim 9 wherein said recesses have a common depth.

12. A transducer as set forth in claim 9 wherein said recesses have different depths.

13. A transducer as set forth in claim 9 and further including an upwardly projecting annular ridge on said surface in contact with an edge of said member.

14. A transducer as set forth in claim 13 wherein said recesses are coaxial with said ridge.

* * * * *